(12) United States Patent
Kuka et al.

(10) Patent No.: US 6,853,931 B2
(45) Date of Patent: Feb. 8, 2005

(54) METHOD AND DEVICE FOR INPUTTING DATA INTO AN ELECTRONIC DATA PROCESSING DEVICE

(75) Inventors: Achim Kuka, Mannheim (DE); Georg Pfaff, Limburgerhof (DE)

(73) Assignee: Pepperl + Fuchs GmbH, Mannheim (DE)

( * ) Notice: Subject to any disclaimer, the term of this patent is extended or adjusted under 35 U.S.C. 154(b) by 0 days.

(21) Appl. No.: 10/398,527

(22) PCT Filed: Mar. 19, 2002

(86) PCT No.: PCT/DE02/00988
§ 371 (c)(1),
(2), (4) Date: Apr. 8, 2003

(87) PCT Pub. No.: WO02/075472
PCT Pub. Date: Sep. 26, 2002

(65) Prior Publication Data
US 2004/0032266 A1 Feb. 19, 2004

(30) Foreign Application Priority Data
May 20, 2001 (DE) .......................................... 101 13 601

(51) Int. Cl.⁷ ............................................... G01R 27/00
(52) U.S. Cl. ...................................... 702/65; 324/76.11
(58) Field of Search ............................... 702/53, 57, 64, 702/65, 79, 80, 89, 104, 116, 119, 120, 126, 183, 188, 189, 193; 324/76.11; 341/162; 330/9; 327/80

(56) References Cited

U.S. PATENT DOCUMENTS

| | | | |
|---|---|---|---|
| 4,716,372 A | * 12/1987 | Fauser et al. | 327/80 |
| 4,833,418 A | * 5/1989 | Quintus et al. | 330/9 |
| 6,486,647 B1 | * 11/2002 | Obrecht | 324/76.11 |
| 6,518,910 B2 | * 2/2003 | Sakuragi et al. | 341/162 |

FOREIGN PATENT DOCUMENTS

| | | |
|---|---|---|
| DE | 4111301 | 10/1992 |
| FR | 2377611 | 8/1978 |
| FR | 2522428 | 9/1983 |
| JP | 60257629 | 12/1985 |
| JP | 61069221 | 4/1986 |
| JP | 10107700 | 4/1998 |

* cited by examiner

Primary Examiner—Donald E. McElheny, Jr.
Assistant Examiner—Mohamed Charioui
(74) Attorney, Agent, or Firm—Collard & Roe, P.C.

(57) ABSTRACT

A process is for data input into an electronic data processing means that has an input and an output, and wherein a program runs in a loop that cyclically queries whether an input voltage whose magnitude is greater or small than a specified threshold value is present at the input. One pole of a voltage source is applied via a series connection made up of a first, a second and a third resistance to the other pole, whereby the voltage dropping at the third resistance forms the input voltage. The first resistance and the second resistance can be regulated.

35 Claims, 3 Drawing Sheets

METHOD AND DEVICE FOR INPUTTING DATA INTO AN ELECTRONIC DATA PROCESSING DEVICE

CROSS REFERENCE TO RELATED APPLICATIONS

Applicants claim priority under 35 U.S.C. §119 of German Application No. 101 13 601.3, filed Mar. 20, 2001. Applicants also claim priority under 35 U.S.C. §365 of PCT/DE02/00988, filed Mar. 19, 2002. The international application under PCT article 21(2) was not published in English.

TECHNICAL AREA

The invention relates to a process and to a device for data input into an electronic data processing means that controls at least one electronic device, whereby said data processing means has an input, an output and a reference connection and wherein a data processing program runs in a loop that cyclically queries whether an input voltage that is greater or smaller than a specified threshold value is present between the input and the reference connection.

STATE OF THE ART

Electronic data processing means, e.g. microcontrollers, are often used for the software-assisted control of devices, e.g. measuring devices or sensors. In many cases, electronic data processing means used for such tasks have a volatile memory, e.g. a register, as well as a non-volatile memory, e.g. an EEPROM, that comprises a software program that serves to control and operate the system in question and comprises any further data that might be needed.

If no possibility exists for data input into the electronic data processing means at its place of use, then a subsequent change of the memory contents is not possible without removing the system, or parts thereof, from its place of use. Furthermore, in cases where the system is cast in a housing, the housing has to be opened for subsequent data input and thus usually has to be destroyed.

In many situations, however, it is advantageous to be able to subsequently input data from a remote site without removing the system from its site of use and without having to open a housing that might be present. Such a situation exists, for example, when a system has to be newly parameterized, calibrated, adjusted or set into a specific operational state.

For example, by influencing a microcontroller that is installed in an inductive approximation sensor and that controls the operation of the sensor from a remote site through the input of appropriate data, it can be necessary to cause the microcontroller to increase the sensitivity of the approximation sensor for a certain period of time and then to reduce it again, without having to dismantle the approximation sensor or parts thereof for this purpose and then having to bring them back to the place of use again. Likewise, it might be necessary to be able to neutralize an undesired shift of a parameter in a device by means of remote control.

In other cases, e.g. in monitoring installations, it can be desirable to be able to change certain parameters of the system through data input from a remote site without interrupting the operation of the system for a prolonged period of time.

Due to the often limited number of lines available for data input from a remote site, the possibility of serial data input is advantageous here, for example, via an RS232 interface. Drawbacks of this method are the requisite additional hardware resources and the need for an additional data line.

Another possibility for serial data input from a remote site is to equip the system with an infrared interface that receives signals in the form of electromagnetic radiation in the infrared spectral range or that emits such signals. Drawbacks of this method are the requisite complex hardware resources, the large space requirement for the necessary hardware as well as the need to keep the beam path free of dirt and obstacles. The latter disadvantage restricts the deployment possibilities of infrared interfaces.

German Patent No. 41°23°828 C2 describes a process for serial data input into a sensor that is based on a modulation of the operating voltage of the electronic data processing means and that can make do without additional data lines. Drawbacks of this method are its complex hardware resources, the need for it to have its own demodulator circuit, the large space requirement for the hardware, the need to install a programming device in the supply line as well as the lack of a possibility to output data from the sensor without an additional line.

TECHNICAL TASK

The invention is based on the task of providing a process and a device for data input with an electronic data processing means that controls an electronic device such as, for example, a sensor, from a remote site, so that the data processing means, for instance, parameterizes or adjusts the electronic device, whereby only minor additional hardware resources and especially°—aside from the two electric lines needed for the power supply to the device°—no additional line or modifications to the housing of the device should be needed.

This task is achieved according to the invention by a process for data input into an electronic data processing means that controls at least one electronic device, whereby said data processing means has an input, an output and a reference connection and wherein a data processing program runs in a loop that cyclically queries whether an input condition is fulfilled which either consists in that, first alternative, between the input and the reference connection, there is an input voltage whose magnitude is greater than a specified threshold value, or which consists in that, second alternative, between the input and the reference connection, there is an input voltage whose magnitude is smaller than a specified threshold value, characterized in that A) either in the case of the first alternative a) one pole of a voltage source is applied via a series connection made up of a first, a second and a third resistance to the other pole of the voltage source, whereby the voltage dropping at the third resistance is applied between the input and the reference connection, thus forming the input voltage, b) the threshold value is selected in such a way that the input condition is fulfilled when and only when the first resistance is smaller than a first limit value and the second resistance is smaller than a second limit value, c) the second resistance is regulated in such a way that it is smaller than the second limit value for a first period of time and subsequently greater than the second limit value for at least a second period of time, d) the first resistance is regulated by the output in such a way that when a query indicates that the input condition is fulfilled, a synchronization of the first resistance is initiated, which consists in that the first resistance is smaller than a third limit value for a third period of time and subsequently greater than a third limit value for a fourth period of time, and before and after the synchronization, the first resistance is constantly or at least temporarily smaller than the first limit value for a time interval in which at least one query is made, e) and, after the end of the first period of time, the data processing program forms digital input information on the basis of the number of synchronizations that were initiated during the first period of time, B) or in the case of the second alternative, a) one pole of a voltage source is applied via a series connection made up of a first, a second and a third resistance to the other pole of the voltage source, whereby the voltage dropping at the third resistance is applied between the input and the reference connection, thus forming the input voltage, b) the threshold value is selected in such a way that the input condition is fulfilled when and only when the first resistance is greater than a first limit value and the second resistance is greater than a second limit value, c) the second resistance is regulated in such a way that it is greater than the second limit value for a first period of time and subsequently smaller than the second limit value for at least a second period of time, d) the first resistance is regulated by the output in such a way that when a query indicates that the input condition is fulfilled, a synchronization of the first resistance is initiated, which consists in that the first resistance is smaller than a third limit value for a third period of time and subsequently greater than a third limit value for a fourth period of time, and before and after the synchronization, the first resistance is constantly or at least temporarily greater than the first limit value for a time interval in which at least one query is made, e) and, after the end of the first period of time, the data processing program forms digital input information on the basis of the number of synchronizations that were initiated during the first period of time.

This task is also achieved by a device for data input into an electronic data processing means that controls at least one electronic device, whereby said data processing means has an input, an output and a reference connection and wherein a data processing program runs in a loop, with the cyclical query as to whether an input condition is fulfilled which either consists in that, first alternative, between the input and the reference connection, there is an input voltage whose magnitude is greater than a specified threshold value, or which consists in that, second alternative, between the input and the reference connection, there is an input voltage whose magnitude is smaller than a specified threshold value, characterized in that A) either in the case of the first alternative a) the device has a series connection made up of a first, a second and a third resistance, whereby one pole of a voltage source is applied via the series connection to the other pole of the voltage source and the voltage dropping at the third resistance is applied between the input and the reference connection, thus forming the input voltage, b) the specified threshold value is selected in such a way that the input condition is fulfilled when and only when the first resistance is smaller than a first limit value and the second resistance is smaller than a second limit value, c) the second resistance can be regulated in such a way that it is smaller than the second limit value for a first period of time and subsequently greater than the second limit value for at least a second period of time, d) the first resistance is regulated by the output in such a way that when a query indicates that the input condition is fulfilled, a synchronization of the first resistance is initiated, which consists in that the first resistance is smaller than a third limit value for a third period of time and subsequently greater than a third limit value for a fourth period of time, and before and after the synchronization, the first resistance is constantly or at least temporarily smaller than the first limit value for a time interval in which at least one query is made, e) and, after the end of the first period of time, the data processing program forms digital input information on the basis of the number of synchronizations that were initiated during the first period of time, B) or in the case of the second alternative a) the device has a series connection made up of a first, a second and a third resistance, whereby one pole of a voltage source is applied via the series connection to the other pole of the voltage source and the voltage dropping at the third resistance is applied between the input and the reference connection, thus forming the input voltage, b) the threshold value is selected in such a way that the input condition is fulfilled when and only when the first resistance is greater than a first limit value and the second resistance is greater than a second limit value, c) the second resistance can be regulated in such a way that it is greater than the second limit value for a first period of time and subsequently smaller than the second limit value for at least a second period of time, d) the first resistance is regulated by the output in such a way that when a query indicates that the input condition is fulfilled, a synchronization of the first resistance is initiated, which consists in that the first resistance is smaller than a third limit value for a third period of time and subsequently greater than a third limit value for a fourth period of time, and before and after the synchronization, the first resistance is constantly or at least temporarily greater than the first limit value for a time interval in which at least one query is made, e) and, after the end of the first period of time, the data processing program forms digital input information on the basis of the number of synchronizations that were initiated during the first period of time.

In an alternative variant, the synchronization of the first resistance does not consist in that the first resistance is smaller than the third limit value for the third period of time and subsequently greater than the third limit value for the fourth period of time, but rather conversely, in that the first resistance is greater than the third limit value for the third period of time and subsequently smaller than the third limit value for the fourth period of time.

According to the invention, both poles of the voltage source are connected via a series connection made up of three resistances, so that a current flows through the three resistances, whereby the first and the second resistances can be regulated and can each assume at least two different values. The current and thus the voltage dropping at the third resistance can thus be influenced by appropriately regulating the first and the second resistances. The voltage dropping at the third resistance, that is to say, the input voltage, is above or below the specified threshold value, depending on how the first and the second resistances are regulated. The input condition is fulfilled when the value of the input voltage is above or below the specified threshold value.

Monitoring and limiting the current that the electronic device draws from the voltage source can be advantageous, for example, for monitoring short circuits. This task can be carried out advantageously according to the invention by the electronic device itself, in that the voltage drop occurring at the third resistance is compared to a prescribed maximum value at the time of each query and, if the maximum value is exceeded, the first resistance is regulated via the output in such a way as to fall below the maximum value again. Moreover, after a certain period of time, the output can regulate the first resistance in such a way that it is once again smaller than the third limit value, in order to ascertain whether the maximum value has once again been exceeded°—°for example, because the short circuit is still present°—or not.

Such behavior is inherent to numerous mass-produced, industrially used sensors and other devices and serves as a short-circuit protection that is provided right from the start and this behavior is referred to as short-circuit synchronization behavior or short-circuit synchronization. With devices thus fitted, the short-circuit synchronization is automatically initiated by short-circuiting the second resistance.

The short-circuit synchronization can be especially advantageously used for the synchronization according to the invention of the first resistance. According to a preferred variant, in the case of the first alternative, the second resistance is approximately zero ohm, preferably less than 0.1 ohm, during the first period of time, in order to systematically bring about the short circuit that initiates the short-circuit synchronization.

In the case of the second alternative, the second resistance can be approximately zero ohm, preferably less than 0.1 ohm, during the second period of time.

In an embodiment of the invention, the first resistance is connected between the second and the third resistances. In an alternative embodiment of the invention, the third resistance is connected between the first and the second resistances.

The software cyclically queries whether the input condition is fulfilled or not. Data can only be input when the query indicates that the input condition is fulfilled. According to the invention, this is only the case when the first resistance is smaller or greater than the first limit value and, at the same time, the second resistance is smaller or greater than the second limit value. In particular, the second resistance can be located at a site away from the electronic data processing means and can be regulated from there.

In an embodiment of the invention, the input condition is only fulfilled when the magnitude of the input voltage is greater than the specified threshold value. In an alternative embodiment of the invention, the input condition is only fulfilled when the magnitude of the input voltage is smaller than the specified threshold value.

If a query indicates that the input condition is fulfilled, then the output regulates the first resistance according to the invention in such a way that the latter carries out a synchronization, that is to say, it is smaller than a third limit value for the third period of time, and subsequently greater than a third limit value for the fourth period of time or vice versa. In a preferred embodiment of the invention, the first and the third limit values are identical.

After the synchronization, the input condition is fulfilled when the second resistance continues to be smaller or greater than the second limit value and when the first resistance is smaller or greater than the first limit value. According to the invention, the latter is constantly or at least temporarily the case for a time interval in which at least one query is made. Therefore, in this case again, this query indicates that the input condition is fulfilled so that a new synchronization is initiated. Therefore, one synchronization after the other is initiated until the input condition is no longer fulfilled. The first period of time can be ended in that the second resistance is regulated in such a way that it is greater or smaller than the second limit value. In this case, the initiation of further synchronizations and thus the data input come to a halt.

According to the invention, after the end of the first period of time, the data processing program forms digital input information, for example, a digital word, on the basis of the number of synchronizations that were initiated during the first period of time. The end of the first period of time can be recognized by the electronic data processing means, for example, by the fact that, at least for a certain period of time, no further synchronization takes place, or by the fact that the input condition was not fulfilled for at least the second period of time. According to a preferred variant of the invention, the end of the first period of time is recognized by the fact that a certain number of queries indicates that the input condition is no longer fulfilled. According to this variant, the end of the first period of time is recognized by the fact that the input condition for at least a certain period of time or for a certain number of queries is not fulfilled.

In this manner, according to the invention, any desired digital input information can be input into the electronic data processing means, which can relay this data or can output it to the electronic device.

The first resistance is regulated by the output in such a way that, before the beginning and after the end of the synchronization, it is constantly or temporarily smaller or greater than the first limit value. In this manner, it is ensured that the input condition does not remain permanently unfulfillable because the first resistance is constantly greater or smaller than the first limit value.

There are various ways to cause the output to at times regulate the first resistance in such a way that it is smaller or greater than the first limit value. If, for example, the electronic device controlled by the electronic data processing means is a sensor that emits a switching signal via the output when it is actuated, then one possibility is to actuate the sensor by systematically influencing the physical parameter it picks up and to use the switching signal to appropriately regulate the first resistance.

A generally usable modality is to configure the software program in such a way that the output always emits a switching signal for a certain period of time immediately every time after the electronic data processing means has been switched on (cold start), and this switching signal is used to regulate the first resistance in such a way that it becomes smaller or greater than the first limit value. In order to bring about the emission of a switching signal at the digital output, in this case, for example, the voltage source merely has to be briefly switched off. Another generally applicable modality is to configure the software program in such a way that, at regular time intervals, the digital output emits a switching signal of a certain duration that is used to regulate the first resistance in such a way that it becomes smaller or greater than the first limit value.

In an embodiment of the invention, the first resistance is regulated before the beginning and after the end of the synchronization, but not during such a synchronization, in such a way that, at regular intervals, it is temporarily smaller than the first limit value in the case of the first alternative or greater than the first limit value in the case of the second alternative.

The result of queries that are made during the third or fourth period of time are preferably not used to initiate a synchronization; this is in order to prevent different synchronizations from overlapping in time or to avoid the need to set up a waiting queue of synchronizations that have been initiated but not yet processed.

In a variant of the invention, following a fourth period of time, the synchronization comprises a fifth period of time in which the first resistance is regulated in such a way that it is smaller than the first limit value in the case of the first alternative, and greater than the first limit value in the case of the second alternative, and in which at least one query is made. In this manner, it is advantageously achieved that, even during the ongoing synchronization, a new synchronization can be initiated and uninterrupted synchronization is made possible. In particular, the sum of the third, fourth and fifth periods of time and the time elapsed between two queries are always constant and identical to each other. If multiple queries are made in the fifth period of time, preferably only the first of these queries is used for initiating a synchronization.

The fifth period of time does not necessarily have to be of a constant duration. On the contrary, the fifth period of time can be ended, for example, immediately after the first query that is made in the fifth period of time and a new synchronization can be initiated, even before the next query is made.

In a preferred embodiment, the query is made periodically. In another embodiment, here the total duration of a synchronization, i.e. the sum of the third, fourth and fifth periods of time as well as the repetition period of the queries are always constant and identical to each other. The mutual phase relationship of query and synchronization is preferably selected here in such a way that no queries are made during the third or fourth period of time.

In a preferred embodiment of the invention, the sum of the voltages of the electronic data processing means dropping at the first and at the third resistances is fed in as the supply voltage so that the data input and the voltage supply can take place make use of the same lines, namely, only via the two lines leading to the poles of the voltage source, and thus advantageously, no separate line is necessary for the communication.

The supply voltage can be supplied to the electronic data processing means via a level transducer.

The software is preferably configured in such a way that it responds every time in a specific manner to a specific piece of digital input information or to a number of pieces of information that have been input in this manner. The transmitted digital input information can be, for example, commands, numeric data, memory addresses or transfer addresses. The electronic device controlled by the data processing means can comprise a non-volatile erasable and programmable memory, e.g. an EEPROM, and the software can be configured in such a way that the memory content of the non-volatile memory is changed through the input of certain digital input information. In this manner, it can be achieved that certain data that is subsequently input, e.g. calibration values subsequently adapted to changed ambient conditions, is available after the system is restarted without the need for this data to be input again. Furthermore, in this manner, for example, an update can be carried out of the so-called firmware, i.e. of the software that runs the electronic data processing means.

Moreover, the software can be configured in such a way that the electronic data processing means is made ready to receive further data only by means of the transmission of a previously unambiguously defined code. This means that, as a barrier against data input that is unintended or erroneous or that is caused by malfunctions, the software initially only responds to one single specific digital word, namely, the code, and interprets this as the command to receive additional commands and data. In this case, additional data can only be input after the code word has been entered.

The software can also be configured in such a way that, after the entry of another specific code word that the electronic data processing means interprets as the command do not receive any additional commands or data, the system goes back to the state in which it is blocked against unwanted data input. Another possibility is to configure the software in such a way that, after a certain code word has been received, the system is ready to receive further input for a certain period of time and then automatically returns to the operational state in which it is blocked against unwanted input.

The first resistance can be a first transistor whose base is connected to the output of the electronic data processing means. If the first and the third limit values are identical, then the first resistance can comprise a first electronic switch and, connected in series to it, a fourth resistance as well as a fifth resistance that are connected in parallel to the series connection made up of the first electronic switch and the fourth resistance. The fourth resistance and the fifth resistance are selected in such a way that the first resistance is greater than the first limit value when the first electronic switch is open and vice versa.

The second resistance can be regulated, for example, by a manually operated mechanical switch or key. Of course, digital words can only be input at a slow speed in this manner, although this can be sufficient for certain applications. The second resistance can also be regulated by an electronic switch or by a control logic. The second resistance can also especially be a second transistor that is regulated by a suitable means such as, for example, a control logic, a microprocessor or a computer, which can, for instance, be a component of a programming device that serves to input data into the electronic data processing means. The second resistance can advantageously be located at a remote site from the electronic data processing means.

In a preferred variant, the second resistance is regulated by a control logic. It can be a component of a programming device.

In one variant of the invention, during the data input, the control logic detects the number of synchronizations on the basis of the fluctuation of the current flowing through the first, second and third resistances, which is associated with each synchronization, and this number is used in the control logic to form the digital input information so that the digital input information is available in the electronic data processing means as well as in the control logic.

According to an embodiment of the invention, the second resistance comprises a second electronic switch and, connected in series to it, a sixth resistance as well as a seventh resistance that are connected in parallel to the series connection made up of the second electronic switch and the sixth resistance. The sixth resistance and the seventh resistance are selected in such a way that the second resistance is greater than the second limit value when the second electronic switch is open and vice versa.

According to an advantageous embodiment, the first resistance comprises a first electronic switch and, connected in series to it, a fourth resistance as well as a fifth resistance that are connected in parallel to the series connection made up of the first electronic switch and the fourth resistance, whereby the fourth resistance and the fifth resistance are selected in such a way that the first resistance is greater or smaller than the first limit value when the first electronic switch is open or closed, and the second resistance comprises a second electronic switch and, connected in series to it, a sixth resistance as well as a seventh resistance that are connected in parallel to the series connection made up of the second electronic switch and the sixth resistance, whereby the sixth resistance and the seventh resistance are selected in such a way that the second resistance is greater or smaller than the second limit value when the second electronic switch is open or closed.

According to another embodiment, the first resistance comprises a first switch and, connected in series to it, a fourth resistance as well as a fifth resistance that are connected in parallel to the series connection made up of the first switch and the fourth resistance, whereby the fourth resistance and the fifth resistance are selected in such a way that the first resistance is greater or smaller than the first limit value when the first electronic switch is open or closed, and the second resistance comprises a second switch as well as a seventh resistance that are connected in parallel to the second switch, whereby the second switch is connected either between the one pole of the voltage source and the first resistance or else between the second pole of the voltage source and the third resistance, and the seventh resistance is selected in such a way that the second resistance is greater or smaller than the second limit value when the second switch is open or closed. This embodiment corresponds to the special case in which the sixth resistance is approximately equal to zero ohm. The advantage of this embodiment lies in the fact that a short circuit that initiates the short-circuit synchronization can be systematically brought about in that the second switch is closed so that data input is possible by means of the short-circuit synchronization. In this manner, the additional hardware resources needed to implement the invention are substantially reduced.

The input of the electronic data processing means can be, for example, a switch input, a data input, a signal input for analog or digital signals or an interrupt input.

According to a preferred embodiment of the invention, not only inputting but also outputting data is possible without an additional line. The current flowing through the series connection made up of the first, second and third resistances is greater or smaller during the third period of time than it is during the fourth period of time and is thus subject to a fluctuation because due to the synchronization. Therefore, the synchronization can advantageously also serve for data output from the electronic data processing means, in that the output regulates the first resistance in such a way that it carries out at least one synchronization, so that the current flowing through the first, second and third resistances is subject to fluctuations in the rhythm of the synchronization or synchronizations. These current fluctuations caused by the synchronization can be detected by the control logic, whereby the control logic can form digital output information on the basis of the number of detected synchronizations. In a preferred embodiment, for this purpose, the voltage dropping at the second resistance is tapped and fed to the control logic. The data that is output can be, for example, measured data of a sensor.

According to an embodiment of the invention, the electronic data processing means outputs data autonomously at least part of the time. According to another embodiment, the electronic data processing means is made to output data through the input of appropriate data.

For example, through the input of an appropriate command, the electronic data processing means can be made to perform a system self-test and subsequently, through the input of further commands, to output the results of the test. In another example, a user can cause the electronic data processing means to inform the user about any momentarily present special operating states, error functions or about momentary internal parameters. In another example, through an appropriate input, special data, e.g. the content of a specific memory address, can be systematically retrieved from the system, and this can be helpful, for instance, for a remote diagnosis of the system in case of operational malfunctions.

According to a variant of the invention, the electronic data processing means can output data via the output, in that the output regulates the first resistance in such a way that it carries out at least one synchronization, so that the current flowing through the first, second and third resistances in the rhythm of the synchronization or synchronizations is subject to fluctuations whose number is detected and used to form digital output information. The fluctuations can be detected in that the voltage dropping at the second resistance is tapped.

The software can also be configured in such a way that, in response to an input of certain digital words, the electronic data processing means outputs signals via the output, on the basis of which the reaction of the sensor to the input can be observed.

According to an embodiment of the invention, the output of data is blocked by the electronic data processing means when the input condition is fulfilled in order to prevent an interference or a time overlapping of the data that is to be input with the data that is to be output.

The software is preferably configured in such a way that, by entering a certain code word, the system is set into a communication mode in which the output of routine digital signals such as, for example, switching signals or measured values, is interrupted in order to prevent an interference with the digital signals that might be output by the system as a response to an input. In this process, the communication mode can only be exited and the output of the routine digital signals can only be resumed again once an appropriate command has been entered. Another possibility is to configure the software in such a way that the system autonomously exits the communication mode when there are no further inputs for a defined period of time. Moreover, the software can be configured in such a way that the digital signals that are to be routinely output are temporarily stored in an intermediate memory as long as the system is in the communication mode.

The invention has the advantages that with it, from a remote place, a parameterization and an adjustment of devices, such as sensors with microcontrollers, is possible without additional hardware resources, and communication can take place during operation; by the same token, the device can also be cast. The parameterization of a device can also be performed by the customer/user. The process is easy to carry out and the device involves a simple switching configuration. Additional electric connections to the device are not necessary for the input or for the output of data.

In a further refinement of the invention, the voltage is supplied to the electronic data processing means via a suitable level transducer so that the operating voltage of the electronic data processing means does not depend on the size of the first, second or third resistances.

Brief description of the drawing in which the preferred embodiments of the invention are depicted schematically.

The following is shown.

METHODS OF EXECUTION

Below, a number of embodiments of the invention will be explained in which the electronic data processing means is a microcontroller that regulates a sensor. First of all, reference will be made to FIGS. 1 and 2, which each show a block diagram on the serial data input into a microcontroller 1 according to alternative embodiments of the invention. The microcontroller 1 controls a sensor 10 and is connected via a bus or lines 6 to a memory 12 and via another bus or lines 7 to a transducer 11 for the physical quantities picked up by the sensor 10. The transducer 11 can be, for example, an inductive approximation switch or an electric temperature transducer.

Figure 1:
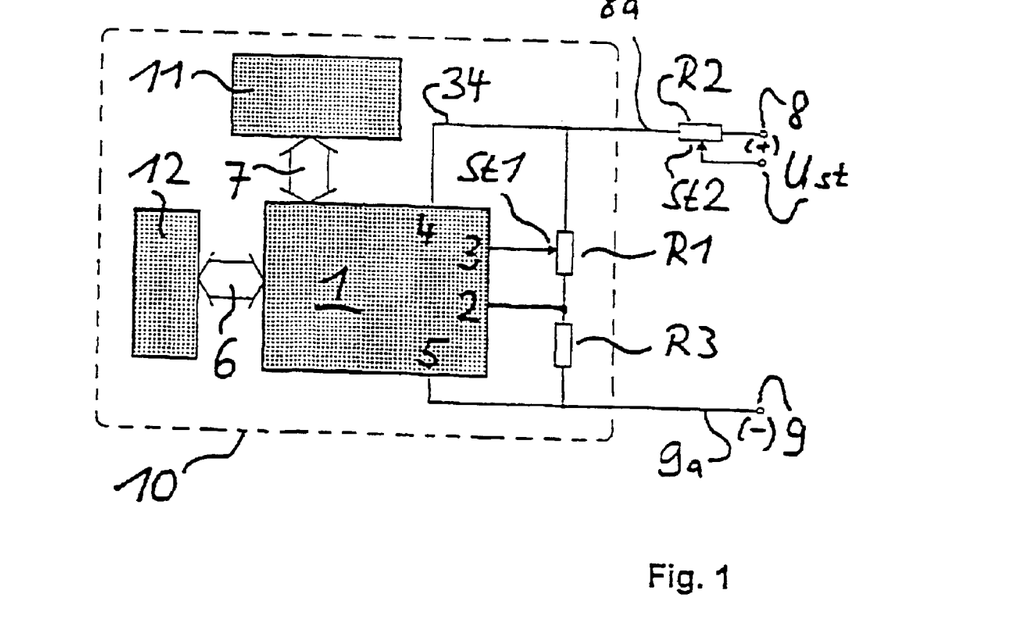
FIG. 1 a schematic circuit for serial data input into a microcontroller according to an embodiment of the invention, FIG. 2 a schematic circuit for serial data input into a microcontroller according to another embodiment of the invention, in which the sequence of the resistances is changed in comparison to FIG. 1, FIG. 3 a schematic representation of the time sequences of the first and second resistances as well as of the input voltage and the points in time of the queries according to a preferred embodiment of the invention, FIG. 4 a schematic circuit for serial data input into a microcontroller according to another embodiment of the invention, and FIGS. 5 and 6 schematic circuits for serial data input and data output into and out of a microcontroller according to further embodiments of the invention.

The microcontroller 1 has an input 2, an output 3, a connection for supply voltage 4 and a reference connection 5. In the microcontroller 1, a data processing program runs in a loop that cyclically queries whether an input condition is fulfilled which consists in that, between the input 2 and the reference connection 5, there is an input voltage Ue whose magnitude is greater than a specified threshold value Uo. The positive pole 8 of a voltage source is applied via a plus line 8a, a series connection made up of a first, second and third resistance R1, R2, R3 and a minus line 9a to the negative pole 9 of the voltage source, whereby the first resistance R1 in the embodiment illustrated in FIG. 1 is connected between the second and third resistances R2, R3. In the alternative embodiment illustrated in FIG. 2, the third resistance R3 is connected between the first and second resistances R1, R2. The voltage dropping at the third resistance R3 is tapped and is applied between the input 2 and the reference connection 5, thus forming the input voltage Ue. The sensor 10 is only connected to the outside via the two lines 8a, 9a. Advantageously, additional lines are not necessary.

A supply voltage is applied to the connection for supply voltage 4 via a supply line 34 and, in the example of FIG. 1, this supply voltage is tapped between the first resistance R1 and the second resistance R2. The sum of the voltages dropping at the first and third resistances R1, R3 is transmitted to the electronic data processing means 1 as the supply voltage. The supply voltage is the potential difference between the connection for the supply voltage 4 and the reference connection 5. The first resistance R1 can be regulated via a first control connection St1 that is connected to the output 3 in such a way that it is smaller or greater than a first limit value G1. The second resistance R2 can be regulated via a second control connection St2 that is connected to a variable voltage Ust in such a way that it is smaller or greater than a second limit value G2.

The two limit values G1, G2 are selected in such a way that the input condition is fulfilled when and only when the second resistance R2 is smaller than the second limit value G2 and at the same time, the first resistance R1 is smaller than the first limit value G1. Only in this case is the current flowing through the third resistance R3 high enough to cause a voltage drop Ue at the third resistance R3 that is greater than the specified threshold value Uo.

Figure 2:
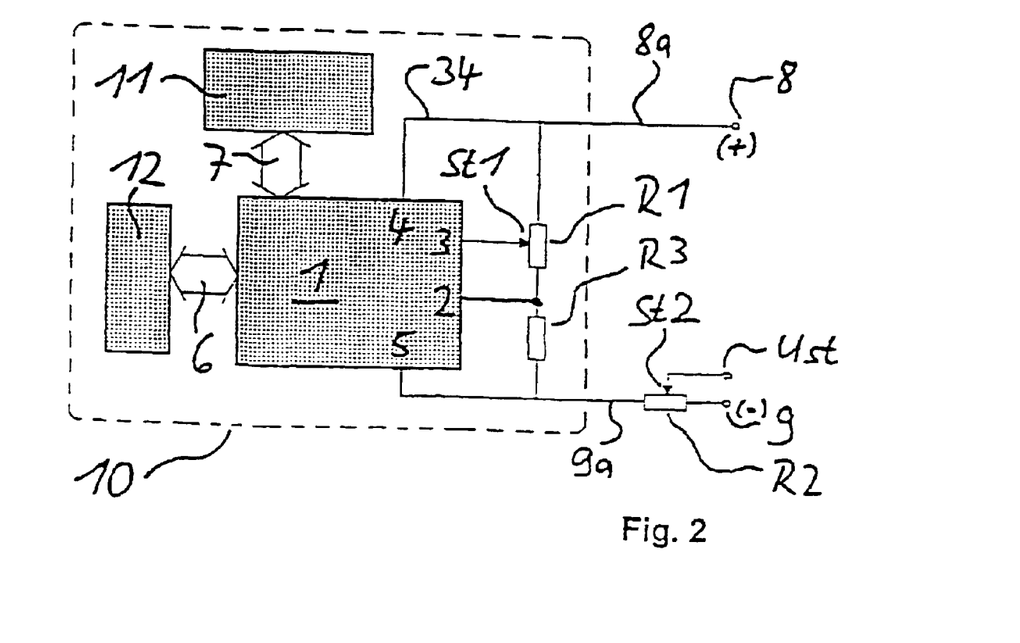

In further embodiments of the invention (not shown here), the polarity of the poles 8, 9 is reversed in comparison to FIGS. 1 and 2.

Figure 3:
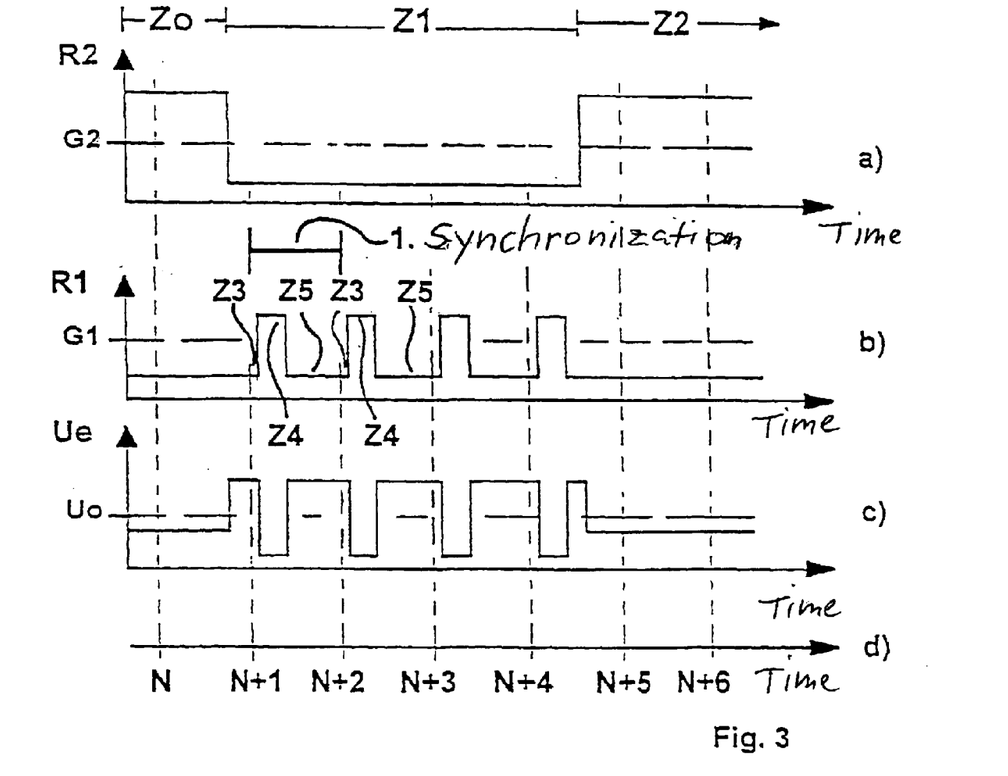

The inputting of data according to the invention into the microcontroller 1 of FIG. 1 or 2 is now explained by way of an example with reference to FIG. 3. FIG. 3 relates to a preferred embodiment of the invention in which a synchronization of the first resistance R1 is initiated when a query indicates that the input condition is fulfilled, whereby the synchronization consists in that the first resistance R1 is smaller than the first limit value G1 for a third period of time Z3, then greater than the first limit value G1 for a fourth period of time Z4, and then again smaller than the first limit value G1 for a fifth period of time Z5. The second resistance R2 is regulated according to the invention by the control voltage Ust in such a way that it is smaller than the second limit value G2 for a first period of time Z1 and then larger than the second limit value G2 for a second period of time Z2. That is to say, the input condition cannot be fulfilled during the second period of time Z2.

Moreover, according to the preferred embodiment explained with reference to FIG. 3, the first resistance R1 is regulated by the output 3 in such a way that, before the beginning and after the end of the synchronization, it is constantly smaller than the first limit value G1. Furthermore, the total duration of a synchronization, i.e. the sum of the third, fourth and fifth periods of time Z3, Z4, Z5, as well as the repetition period of the queries are constant and identical to each other. The mutual phase relationship of query and synchronization is selected here in such a way that no queries are made during the third or fourth period of time Z3, Z4 so that during the fifth period of time Z5, always precisely one query is made.

In the preferred embodiment explained with reference to FIG. 3, the end of the first period of time Zips recognized by the electronic data processing means 1 by the fact that a query indicates that the input condition is no longer fulfilled.

FIG. 3a shows a schematic representation of the time sequence of the second resistance R2 of FIG. 1, said time sequence at first being greater than the second limit value G2 during a period of time Zo. Therefore, at the point in time of a query N, which falls in the time Zo, the input condition is not fulfilled so that the result of the query N does not initiate a synchronization. Then the second resistance R2 is regulated by a voltage USt, which is applied to the control input St2, in such a way that it is smaller than the second limit value G2 for the first period of time Z1 and then larger than the second limit value G2 for the second period of time Z2.

The first resistance R1 is regulated by the output 3 (FIG. 1, FIG. 2) in such a way that, before the beginning and after the end of the synchronization, it is constantly smaller than the first limit value G1 (FIG. 3b). Consequently, the input condition is immediately fulfilled at the beginning of the first period of time Z1. Therefore, the following query N+1 (FIG. 3d) indicates that the input condition is fulfilled. Thus, now a first synchronization of the first resistance R1 is initiated which consists in that the first resistance is smaller than the first limit value G1 for the third period of time Z3, then larger than the first limit value G1 for the fourth period of time Z4 and then again smaller than the first limit value G1 for the fifth period of time Z5.

The next query N+2 and the two subsequent queries N+3, N+4 indicate in the example explained with reference to FIG. 3 that the input condition is fulfilled since the first resistance R1 during each of the fifth periods of time Zips smaller than the first limit value G1 and the second resistance R2 remains smaller than the first limit value G1 for the continuing period of time Z1. Therefore, the queries N+2, N+3 and N+4 are followed by a second, a third and a fourth synchronization.

The first period of time Z1 transpires during the fourth synchronization in the example explained with reference to FIG. 3. The result is that the input condition at the point in time of the next query N+5 is no longer fulfilled. Therefore, the query N+5 does not initiate any further synchronization. After the end of the first period of time Z1, the data processing program forms digital input information, e.g. a digital word, on the basis of the number of synchronizations that were initiated during the first period of time Z1. According to a preferred embodiment of the invention, the end of the first period of time Z1 is recognized by the electronic data processing means 1 by the fact that a query indicates that the input condition is no longer fulfilled.

Of course, data can subsequently be input once again according to the pattern explained above. The prerequisite for this is that the second resistance R2 is once again regulated in such a way that it is smaller than the second limit value G2. Through the appropriate selection of the number of synchronizations, any digital data can be input in this manner.

On the basis of the changes in the first and second resistances R1, R2, the current flowing through the third resistance R3 also changes, so that the input voltage Ue has the curve shown in FIG. 3c. In particular, whenever the first resistance R1 is smaller than the first limit value G1 and the second resistance R2 is smaller than the second limit value G2, the input voltage Ue is greater than the specified threshold value Uo, so that the input condition is fulfilled.

Figure 4:
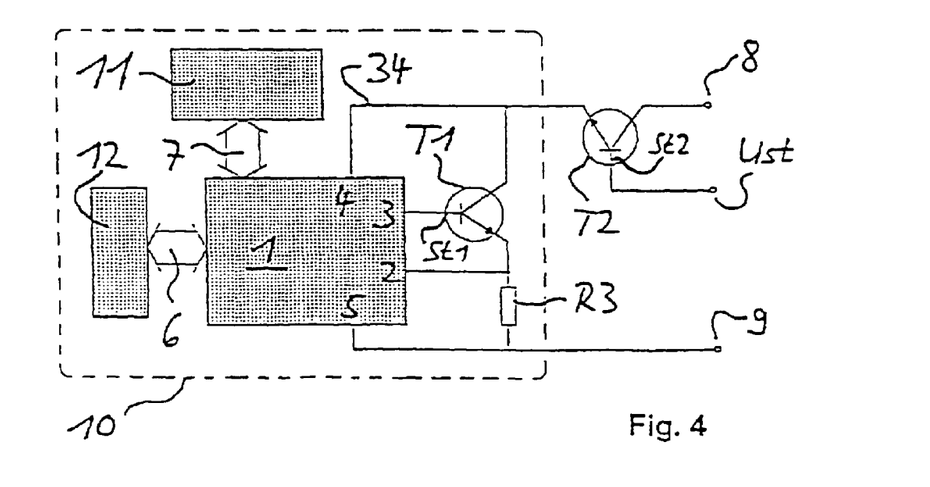

FIG. 4 shows a block diagram for serial data input into a microcontroller 1 according to another embodiment of the invention in which the regulatable first resistance R1 of FIG. 1 is made up of a first transistor T1 and the regulatable second resistance R2 of FIG. 1 is made up of a second transistor T2.

Figure 5:
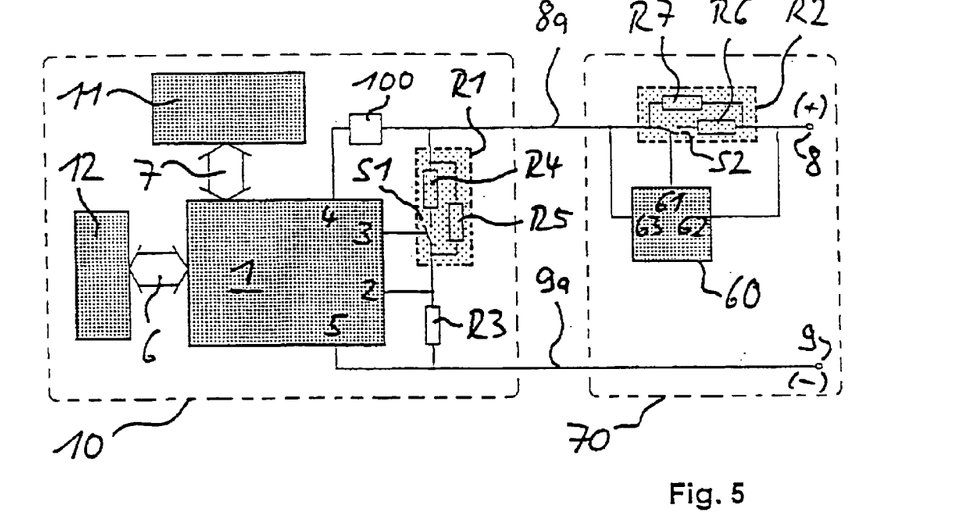

FIG. 5 shows a block diagram for serial data input into the microcontroller 1 according to a preferred embodiment of the invention in which the regulatable first resistance R1 of FIG. 1 comprises a first electronic switch S1 and, connected in series to it, a fourth resistance R4 as well as a fifth resistance R5 that is connected in parallel to the series connection made up of the first electronic switch S1 and the fourth resistance R4. The fourth and fifth resistances R4, R5 are selected in such a way that the first resistance R1 is greater or smaller than the first limit value G1 when the first electronic switch S1 is open or closed. The first electronic switch has a control input that is connected to the output 3 of the microcontroller 1. Thus, the first electronic switch can be controlled via the output 3.

Moreover, in FIG. 5, the second resistance R2 of FIG. 1 comprises a second electronic switch S2 and, connected in series to it, a sixth resistance R6 as well as a seventh resistance R7 that is connected in parallel to the series connection made up of the second electronic switch S2 and the sixth resistance R6. The sixth and seventh resistances R6, R7 are selected in such a way that the second resistance R2 is greater or smaller than the first limit value G1 when the second electronic switch S2 is open or closed.

The second electronic switch 52 is controlled by a control logic 60 having a switching output 61 that is connected to the control input of the second electronic switch S2. The second electronic switch S2, the sixth and seventh resistances R6, R7, the control logic 60 as well as the voltage source with the positive pole 8 and the negative pole 9 are all components of a programming device 70 that is only connected to the sensor 10 via the plus line 8a and the minus line 9a. The control logic 60 is configured in such a way that it emits switching signals via the switching output 61 in a sequence corresponding to the data that is to be entered into the microcontroller 1. For this purpose, in a preferred embodiment of the invention, the control logic 60 comprises a separate means for electronic data processing, e.g. a microprocessor or a computer, whereby the second resistance R2 is regulated by means of a suitable program. The data to be entered into the microcontroller 1 can be input directly, for example, by means of a keyboard, into the control logic 60 or else it can be retrieved from a memory or generated within the control logic 60 by means of software.

The voltage drop at the second resistance R2 is tapped in FIG. 5 and transmitted to two inputs 62, 63 of the control logic 60 so that the latter is able to detect the voltage drop at the resistance R2 and thus the current flowing through the second resistance R2 through the formation of a differential value of the voltages present at the inputs 62, 63. A synchronization of the first resistance R1 brings about a fluctuation of the current through the second resistance R2, which the control logic 60 can detect by means of the differential input 62, 63. Thus, if the control logic 60 is appropriately programmed, it is able to count the number of synchronizations of the first resistance R1 during the data input according to the invention, thus monitoring it. In this way, during data input, the target number of synchronizations, which is determined by the period of time Z1, can be compared to the actually executed number of synchronizations and any errors or malfunctions that occur during the data input can immediately be determined.

Moreover, the detection of the voltage drop at the second resistance R2 can also serve to enable an output of data from the microcontroller 1 without an additional line, in that the microcontroller regulates the first resistance R1 corresponding to the data that is to be output via the output 3 in a time-dependent manner, for example, synchronizing it as explained with reference to FIG. 2. The current fluctuations thus caused can also be detected, evaluated and especially converted into digital words by the control logic 60.

Under the condition that the first resistance R1 can be regulated continuously or in sufficiently many stages, that is to say, it is, for example, a transistor T1, another possibility for the output of data is that the microcontroller 1 uses its output 3 to regulate the first resistance R1 in such a way that the magnitude of the current corresponds to the output information that is to be output in each case. The time course of the current thus caused can be detected, for example, by means of an A/D converter, then evaluated and especially converted into digital words by the control logic 60.

Figure 6:
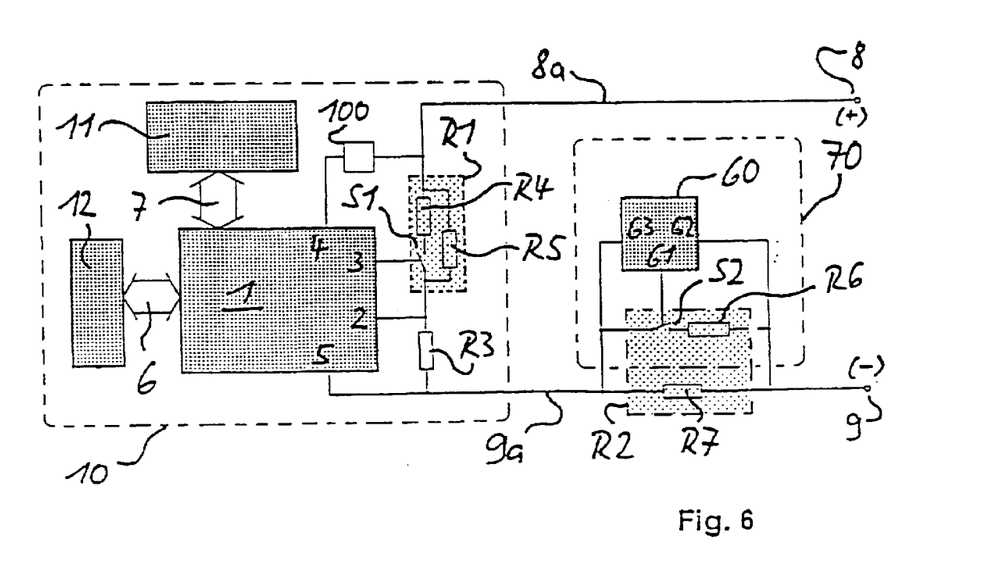

FIG. 6 shows an embodiment in which, analogously to the embodiment explained with reference to FIG. 5, the first resistance R1 is made up of a first electronic switch S1 as well as two resistances R4, R5, and the second resistance R2 is made up of a second electronic switch S1 as well as two resistances R6, R7. In contrast to FIG. 5, however, in FIG. 6, the third resistance R3 is connected between the first and second resistances R1, R2. Therefore, the sequence of the resistances R1, R2, R3 in FIG. 6 corresponds to that of FIG. 2. Moreover, in FIG. 6, the poles 8, 9 of the voltage source as well as the resistance R7 are arranged outside of the programming device 70, which is advantageous in many application cases.

Furthermore, in actual practice, it can be advantageous to monitor and limit the current that the electronic device 10 draws from the voltage source. If, for example, the first resistance R1 is a transistor T1 (FIG. 4), then a limitation of the current to protect the transistor T1, for instance, against short circuits, can be practical. According to the invention, this task can advantageously be carried out by the electronic device 10 itself in that the software of the microcontroller 1 compares the voltage drop that occurs at the third resistance R3 during each query to a predefined maximum value and, if the maximum value is exceeded, the software regulates the first resistance R1 via the output 3 in such a way that the value falls below the maximum value once again.

In actual practice, in many cases, a pre-resistance is already installed between the electronic device 10 and one of the poles 8, 9 of the voltage source, for example, for purposes of limiting the current that is drawn from the voltage source. This pre-resistance can advantageously be used to fulfill the function of the resistance R7 of FIG. 5 or FIG. 6.

Especially advantageously for this purpose, the output 3 can regulate the resistance R1 in such a way that it is greater than a third limit value G3 if a query indicates that the maximum value has been exceeded, and the third limit value G3 can be selected in such a way that the maximum value is not reached when the first resistance R1 is greater than the third limit value G3. Moreover, after a certain period of time, the output 3 can regulate the first resistance R1 in such a way that it is again smaller than the third limit value G3 in order to determine whether the maximum value has once again been exceeded°—for example, since the short circuit is still present°—or not. Such behavior is referred to as the short-circuit synchronization behavior. The first resistance R1 can be especially advantageously regulated by the synchronization of the first resistance explained above; conversely, any hardware that might already be available for short-circuit synchronization can very advantageously be used to synchronize the first resistance for purposes of data input. In order to initiate the short-circuit synchronization, only the second resistance has to be short-circuited.

According to a variant of the invention (not shown here) that has been modified in comparison to the circuit of FIG. 5, the sixth resistance is thus eliminated, whereby the switch S2 is directly connected to the plus pole 8 of the voltage source 8, 9. By the same token, according to a variant of the invention (likewise not shown here) modified in comparison to the circuit of FIG. 6, the sixth resistance is eliminated so that the switch S2 of FIG. 6 is directly connected to the minus pole 9 of the voltage source 8, 9. These instances each correspond to the special case in which the sixth resistance R6 of FIG. 5 or FIG. 6 is equal to or approximately equal to zero. Therefore, by closing the switch S2, the short-circuit synchronization explained above can be initiated. With these variants, the synchronization according to the invention can advantageously utilize the short-circuit synchronization behavior described above that is, for example, inherent to a large number of industrially used sensors and serves as a short-circuit protection that is provided right from the start.

COMMERCIAL APPLICABILITY

The invention is especially commercially applicable for serial data communication between a sensor, such as an approximation switch, and a data processing means such as a programming device or a microcontroller.

The main figure is FIG. 4.

LIST OF REFERNCE NUMERALS 1 microcontroller
2 input of 1
3 output of 1
4 connection for supply voltage of 1
5 reference connection of 1
6 bus connection to the memory
7 bus connection to the transducer
8, 9 positive, negative pole of the voltage source
8a plus line
9a minus line
10 sensor
11 transducer
12 memory
34 voltage supply line
60 control logic
61 output of 60
62, 63 inputs of 60
70 programming device
R1–R7 first to seventh resistances
T1, T2 first, second transistors
S1, S2 first, second electronic switches
Ust control voltage for R2

What is claimed is:

1. A process for data input into an electronic data processing means (1) that controls at least one electronic device (10), whereby said data processing means (1) has an input (2), an output (3) and a reference connection (5) and wherein a data processing program runs in a loop that cyclically queries whether an input condition is fulfilled which either consists in that, first alternative, between the input (2) and the reference connection (5), there is an input voltage (ue) whose magnitude is greater than a specified threshold value (Uo), or which consists in that, second alternative, between the input (2) and the reference connection (5), there is an input voltage (Ue) whose magnitude is smaller than a specified threshold value (Uo), wherein A) either in the case of the first alternative a) one pole (8) of a voltage source is applied via a series connection made up of a first, a second and third resistance (R1, R2, R3) to the other pole (9) of the voltage source, whereby the voltage dropping at the third resistance (R3) is applied between the input (2) and the reference connection (5), thus forming the input voltage (Ue), b) the threshold value (Uo) is selected in such a way that the input condition is fulfilled when and only when the first resistance (R1) is smaller than a first limit value (G1) and the second resistance (R2) is smaller than a second limit value (G2), c) the second resistance (R2) is regulated in such a way that it is smaller than the second limit value (G2) for a first period of time (Z1) and subsequently greater than the second limit value (G2) for at least a second period of time (Z2), d) the first resistance (R1) is regulated by the output (3) in such a way that
when a query indicates that the input condition is fulfilled, a synchronization of the first resistance (R1) is initiated, which consists in that the first resistance is smaller than a third limit value (G3) for a third period of time (Z3) and subsequently greater than a third limit value (G3) for a fourth period of time (Z4), and before and after the synchronization, the first resistance (R1) is constantly or at least temporarily smaller than the first limit value (G1) for a time interval in which at least one query is made, e) and, after the end of the first period of time (Z1), the data processing program forms digital input information on the basis of the number of synchronizations that were initiated during the first period of time (Z1), B) or in the case of the second alternative, a) one pole (8) of a voltage source is applied via a series connection made up of a first, a second and a third resistance (R1, R2, R3) to the other pole (9) of the voltage source, whereby the voltage dropping at the third resistance (R3) is applied between the input (2) and the reference connection (5), thus forming the input voltage (Ue), b) the threshold value (Uo) is selected in such a way that the input condition is fulfilled when and only when the first resistance (R1) is greater than a first limit value (G1) and the second resistance (R2) is greater, than a second limit value (G2), c) the second resistance (R2) is regulated in such a way that it is greater than the second limit value (G2) for a first period of time (Zl) and subsequently smaller than the second limit value (G2) for at least a second period of time (Z2), d) the first resistance (R1) is regulated by the output (3) in such a way that when a query indicates that the input condition is fulfilled, a synchronization of the first resistance (R1) is initiated, which consists in that the first resistance is smaller than a third limit value (G3) for a third period of time (Z3) and subsequently greater than a third limit value (G3) for a fourth period of time (Z4), and before and after the synchronization, the first resistance (R1) is constantly or at least temporarily greater than the first limit value (G1) for a time interval in which at least one query is made, e) and, after the end of the first period of time (Z1), the data processing program forms digital input information on the basis of the number of synchronizations that were initiated during the first period of time (Z1).

2. The process according to claim 1,
wherein the synchronization comprises a fourth period of time (Z4) that is followed by a fifth period of time (Z5) in which the first resistance (R1) is regulated in such a way that it is smaller than the first limit value (G1) in the case of the first alternative, and greater than the first limit value (G1) in the case of the second alternative, and in which at least one query is made.

3. The process according to claim 2,
wherein if multiple queries are made in the fifth period of time (Z5), only the first of these queries is used for initiating a synchronization.

4. The process according to claim 2,
wherein after the first query, which is made in the fifth period of time (Z5), the fifth period of time (Z5) is ended before the next query is made, and a new synchronization is initiated.

5. The process according to claim 2,
wherein the sum of the third, fourth and fifth periods of time (Z3, Z4, Z5) and the time elapsed between two queries are always constant and identical to each other.

6. The process according to claim 2,
wherein the end of the first period of time (Z1) is recognized by the fact that at least for a certain period of time, no further synchronization takes place.

7. The process according to claim 2,
wherein the end of the first period of time (Z1) is recognized by the fact that the input condition is not fulfilled for at least a certain period of time or for a certain number of queries.

8. The process according to claim 1,
wherein the first resistance (R1) is connected between the second and third resistances (R2, R3) or the third resistance (R3) is connected between the first and second resistances (R1, R2).

9. The process according to claim 8,
wherein the sum of the voltages of the electronic data processing means (1) dropping at the first and third resistances (R1, R3) is fed in as the supply voltage.

10. The process according to claim 1,
wherein the second resistance (R2) is regulated by a control logic (60).

11. The process according to claim 10,
wherein during data input, the control logic (60) detects the number of synchronizations on the basis of the fluctuation of the current flowing through the first, second and third resistances (R1, R2, R3), which is associated with each synchronization, and this number is used in the control logic (60) to form the digital input information so that the digital input information is available in the electronic data processing means (1) as well as in the control logic (60).

12. The process according to claim 1,
wherein the electronic data processing means (1) can output data via the output (3), in that the output (3) regulates the first resistance (R1) in such a way that it carries out at least one synchronization, so that the current flowing through the first, second and third resistances (R1, R2, R3) is subject to fluctuations in the rhythm of the synchronization or synchronizations, the number of which is detected and used to form digital output information.

13. The process according to claim 12,
wherein the fluctuations are detected in that the voltage dropping at the second resistance (R2) is tapped.

14. The process according to claim 1,
wherein the synchronization of the first resistance (R1) does not consist in that the first resistance is smaller than the third limit value (G3) for the third period of time (Z3) and subsequently greater than the third limit value (G3) for the fourth period of time (Z4), but rather conversely in that the first resistance is greater than the third limit value (G3) for the third period of time (Z3) and subsequently smaller than the third limit value (G3) for the fourth period of time (Z4).

15. The process according to claim 1,
wherein in the case of the first alternative, the second resistance (R2) is approximately zero ohm, preferably less than 0.1 ohm, during the first period of time (Z1) or, in the case of the second alternative, the second resistance (R2) is approximately zero ohm, preferably less than 0.1 ohm during the second period of time (Z2).

16. The process according to claim 1,
wherein the first and the third limit values (G1, G3) are identical.

17. The process according to claim 1,
wherein the first resistance (R1) is regulated before the beginning and after the end of the synchronization, but not during such a synchronization, in such a way that, at regular intervals, it is temporarily smaller than the first limit value (G1) in the case of the first alternative or greater than the first limit value (G1) in the case of the second alternative.

18. The process according to claim 1,
wherein, the result of queries that are made during the third or fourth period of time (Z3, Z4) are not used to initiate a synchronization.

19. The process according to claim 1,
wherein the electronic data processing means (1) is only made ready to receive further data by means of the transmission of a previously unambiguously defined code.

20. A device for data input into an electronic data processing means (1) that controls at least one electronic device (10), whereby said data processing means (1) has an input (2), an output (3) and a reference connection (5) and wherein a data processing program runs in a loop, with the cyclical query as to whether an input condition is fulfilled which either consists in that, first alternative, between the input (2) and the reference connection (5), there is an input voltage (Ue) whose magnitude is greater than a specified threshold value (Uo), or which consists in that, second alternative, between the input (2) and the reference connection (5), there is an input voltage (Ue) whose magnitude is smaller than a specified threshold value (Uo),
wherein
  A) either in the case of the first alternative
    a) the device has a series connection made up of a first, a second and a third resistance (R1, R2, R3), whereby one pole (8) of a voltage source is applied via the series connection to the other pole (9) of the voltage source and the voltage dropping at the third resistance (R3) is applied between the input (2) and the reference connection (5), thus forming the input voltage (Ue),
    b) the specified threshold value (Uo) is selected in such a way that the input condition is fulfilled when and only when the first resistance (R1) is smaller than a first limit value (G1) and the second resistance (R2) is smaller than a second limit value (G2),
    c) the second resistance (R2) can be regulated in such a way that it is smaller than the second limit value (G2) for a first period of time (Z1) and subsequently greater than the second limit value (G2) for at least a second period of time (Z2),
    d) the first resistance (R1) is regulated by the output (3) in such a way that
      when a query indicates that the input condition is fulfilled, a synchronization of the first resistance (R1) is initiated, which consists in that the first resistance is smaller than a third limit value (G3) for a third period of time (Z3) and subsequently greater than a third limit value (G3) for a fourth period of time (Z4), and
      before and after the synchronization, the first resistance (R1) is constantly or at least temporarily smaller than the first limit value (G1) for a time interval in which at least one query is made,
    e) and, after the end of the first period of time (Z1), the data processing program forms digital input information on the basis of the number of synchronizations that were initiated during the first period of time (Z1),
  B) or in the case of the second alternative
    a) the device has a series connection made up of a first, a second and a third resistance (R1, R2, R3), whereby one pole (8) of a voltage source is applied via the series connection to the other pole (9) of the voltage source and the voltage dropping at the third resistance (R3) is applied between the input (2) and the reference connection (5), thus forming the input voltage (Ue),
    b) the threshold value (Uo) is selected in such a way that the input condition is fulfilled when and only when the first resistance (R1) is greater than a first limit value (G1) and the second resistance (R2) is greater than a second limit value (G2),
    c) the second resistance CR2) can be regulated in such a way that it is greater than the second limit value (G2) for a first period of time (Z1) and subsequently smaller than the second limit value (G2) for at least a second period of time (Z2),
    d) the first resistance (R1) is regulated by the output (3) in such a way that
      when a query indicates that the input condition is fulfilled, a synchronization of the first resistance (R1) is initiated, which consists in that the first resistance is smaller than a third limit value (G3) for a third period of time (Z3) and subsequently greater than a third limit value (G3) for a fourth period of time (Z4), and
      before and after the synchronization, the first resistance (R1) is constantly or at least temporarily greater than the first limit value (G1) for a time interval in which at least one query is made,
    e) and, after the end of the first period of time (Z1), the data processing program forms digital input information on the basis of the number of synchronizations that were initiated during the first period of time (Z1).

21. The device according to claim 20,
wherein a control logic (60) regulates the second resistance (R2).

22. The device according to claim 21,
wherein during data input, the control logic (60) detects the number of synchronizations on the basis of the fluctuation of the current flowing through the first, second and third resistances (R1, R2, R3), which is associated with each synchronization, and this number is used to form the digital input information so that the digital input information is available in the electronic data processing means (1) as well as in the control logic (60).

23. The device according to claim 21,
wherein the control logic (60) is a component of a programming device (70).

24. The device according to claim 20,
wherein the first and the third limit values (G1, G3) are identical.

25. The device according to claim 24,
wherein the first resistance (R1) is connected between the second and third resistances (R2, R3) or the third resistance (R3) is connected between the first and second resistances (R1, R2).

26. The device according to claim 25,
wherein the sum of the voltages of the electronic data processing means (1) dropping at the first and third resistances (R1, R3) is fed in as the supply voltage.

27. The device according to claim 20,
wherein the synchronization of the first resistance (R1) does not consist in that the first resistance is smaller than the third limit value (G3) for the third period of time (Z3) and subsequently greater than the third limit value (G3) for the fourth period of time (Z4), but rather conversely in that the first resistance is greater than the third limit value (G3) for the third period of time (Z3) and subsequently smaller than the third limit value (G3) for the fourth period of time (Z4).

28. The device according to claim 20, wherein in the case of the first alternative, the second resistance (R2) is approximately zero ohm, preferably less than 0.1 ohm, during the first period of time (Z1) or, in the case of the second alternative, the second resistance (R2) is approximately zero ohm, preferably less than 0.1 ohm, during the second period of time (Z2).

29. The device according to claim 20, wherein the synchronization comprises a fourth period of time (Z4) that is followed by a fifth period of time (Z5) in which the first resistance (R1) is regulated in such a way that it is smaller than the first limit value (G1) in the case of the first alternative, and greater than the first limit value (G1) in the case of the second alternative, and in which at least one query is made, whereby the sum of the third, fourth and fifth periods of time (Z3, Z4, Z5) and the time elapsed between two queries are always constant and identical to each other.

30. The device according to claim 20, wherein the end of the first period of time (Z1) is recognized by the fact that at least for a certain period of time, no further synchronization takes place.

31. The device according to claim 20, wherein the end of the first period of time (Z1) is recognized by the fact that the input condition is not fulfilled for at least a certain period of time or for a certain number of queries.

32. The device according to claim 20, wherein the first resistance (R1) comprises a first electronic switch (S1) and, connected in series to it, a fourth resistance (R4) as well as a fifth resistance (R5) that is connected in parallel to the series connection made up of the first electronic switch (S1) and the fourth resistance (R4), whereby the fourth and fifth resistances (R4, R5) are selected in such a way that the first resistance (R1) is greater or smaller than the first limit value (G1) when the first electronic switch (S1) is open or closed, and the second resistance (R2) comprises a second electronic switch (S2) and, connected in series to it, a sixth resistance (R6) as well as a seventh resistance (R7) that is connected in parallel to the series connection made up of the second electronic switch (S2) and the sixth resistance (R6), whereby the sixth and seventh resistances (R6, R7) are selected in such a way that the second resistance (R2) is greater or smaller than the second limit value (G2) when the second electronic switch (S2) is open or closed.

33. The device according to claim 20, wherein the first resistance (R1) comprises a first switch and, connected in series to it, a fourth resistance (R4) as well as a fifth resistance (R5) that is connected in parallel to the series connection made up of the first switch and the fourth resistance (R4), whereby the fourth resistance and fifth resistance (R4, R5) are selected in such a way that the first resistance (R1) is greater or smaller than the first limit value (G1) when the first electronic switch is open or closed, and the second resistance (R2) comprises a second switch as well as a seventh resistance (R7) that is connected in parallel to the second switch, whereby the second switch is connected either between the one pole (8) of the voltage source and the first resistance (R1) or else between the second pole (9) of the voltage source and the third resistance (R3), and the seventh resistance (R7) is selected in such a way that the second resistance (R2) is greater or smaller than the second limit value (G2) when the second switch is open or closed.

34. The device according to claim 20, wherein the electronic data processing means (1) can output data via the output (3), in that the output (3) regulates the first resistance (R1) in such a way that it carriers out at least one synchronization, so that the current flowing through the first, second and third resistances (R1, R2, R3) is subject to fluctuations in the rhythm of the synchronization or synchronizations, the number of which is detected and used to form digital output information.

35. The device according to claim 20, wherein the voltage is supplied to the electronic data processing means (1) via a level transducer (100).

* * * * *

UNITED STATES PATENT AND TRADEMARK OFFICE
CERTIFICATE OF CORRECTION

PATENT NO. : 6,853,931 B2
DATED : February 8, 2005
INVENTOR(S) : Kuka et al.

It is certified that error appears in the above-identified patent and that said Letters Patent is hereby corrected as shown below:

Title page,
Item [30], Foreign Application Priority Data, please change the Claim of Priority to read as follows:
-- Mar. 20, 2001   (DE) ......... 101 13 601 --.

Signed and Sealed this

Tenth Day of May, 2005

JON W. DUDAS
*Director of the United States Patent and Trademark Office*